J. C. THOM.
MECHANISM FOR ARRANGING AND FEEDING CYLINDRICAL BOX BODIES.
APPLICATION FILED DEC. 10, 1920.
1,416,763.
Patented May 23, 1922.
2 SHEETS—SHEET 1.
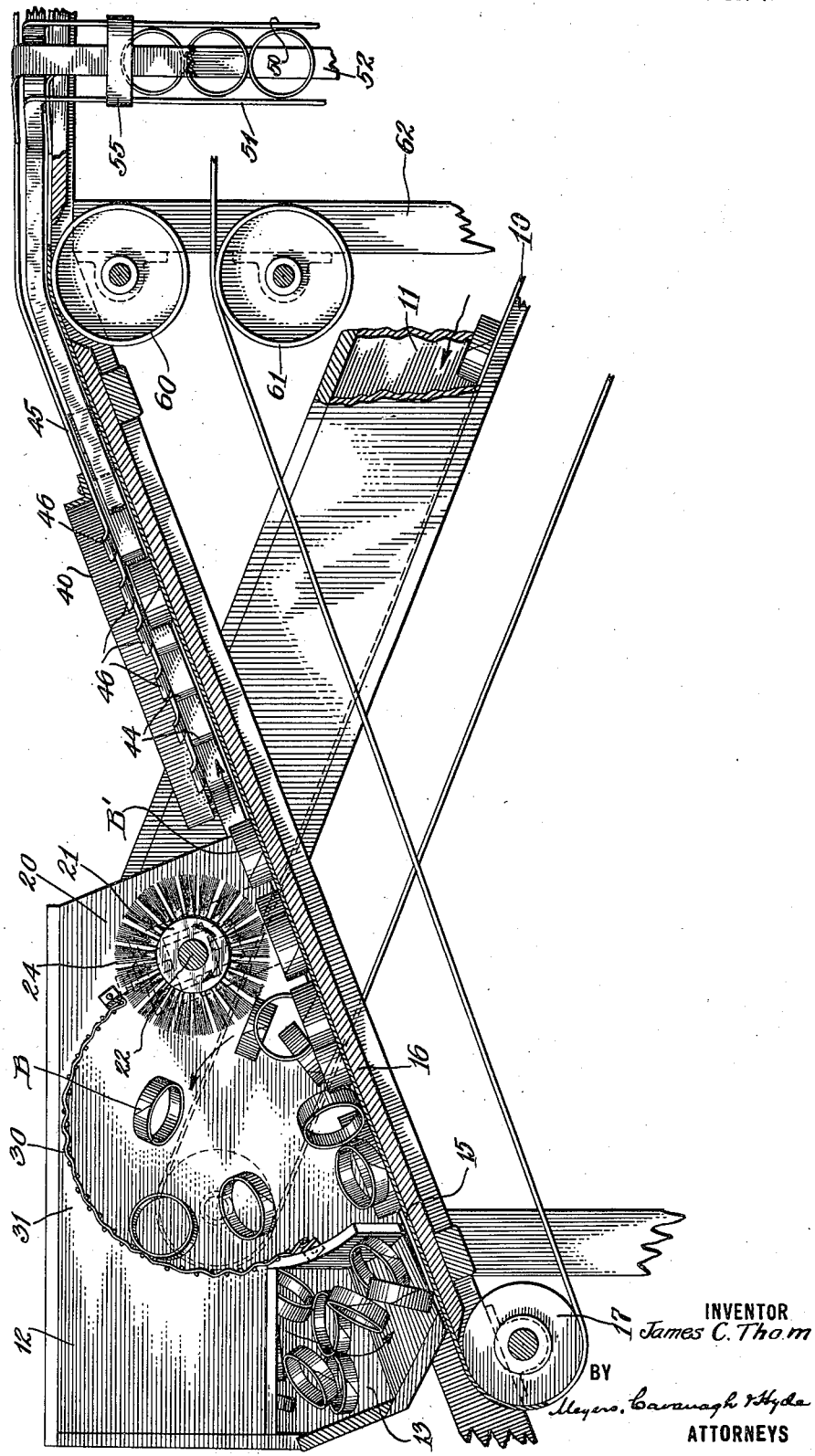
INVENTOR
James C. Thom
BY
Meyers, Cavanagh & Hyde
ATTORNEYS

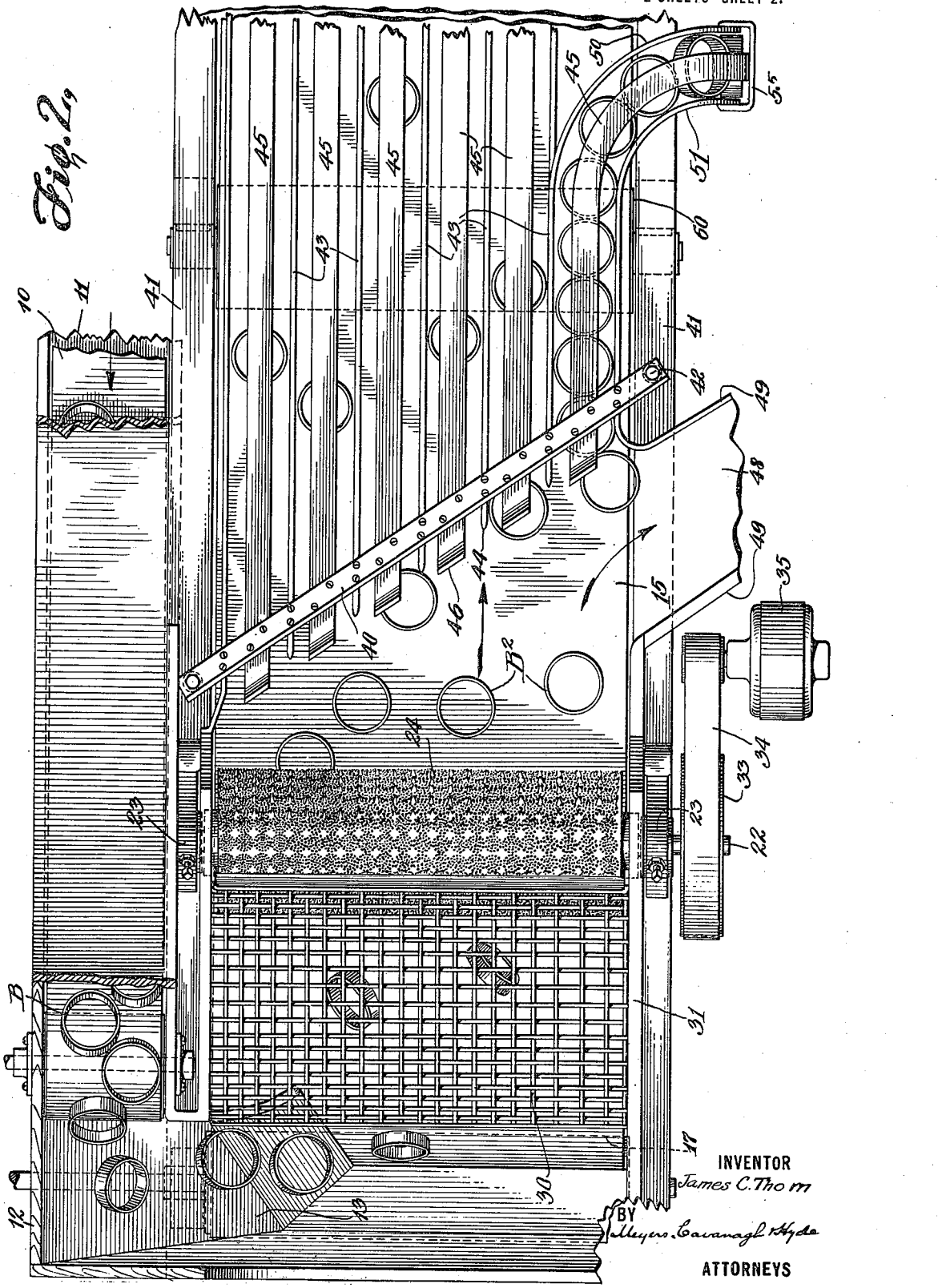

UNITED STATES PATENT OFFICE.

JAMES C. THOM, OF CHICAGO, ILLINOIS, ASSIGNOR TO COMBINATION MACHINE COMPANY, OF NEW YORK, N. Y., A CORPORATION OF DELAWARE.

MECHANISM FOR ARRANGING AND FEEDING CYLINDRICAL BOX BODIES.

1,416,763.

Specification of Letters Patent. Patented May 23, 1922.

Application filed December 10, 1920. Serial No. 429,674.

*To all whom it may concern:*

Be it known that I, JAMES C. THOM, a citizen of the United States, and resident of Chicago, in the county of Cook and State of Illinois, have invented certain new and useful Improvements in Mechanism for Arranging and Feeding Cylindrical Box Bodies, of which the following is a specification.

My invention relates to mechanism for arranging and feeding circular bodies, such for example as short, cylindrical box bodies.

Such bodies, in the form of short cylindrical rings, are usually produced by rolling material such as fibre or cardboard, into relatively long cylinders, and the material is customarily supplied in strip form and rolled spirally. The cylinder is then cut transversely at suitably spaced intervals, producing the box bodies having a wall length equal to the distance between cuts. Usually this wall length, or depth, of the body, is substantially less than the diameter, so that when the bodies are placed with either open side down on a flat support, they are not easily overturned. These bodies are usually provided with end caps, to produce complete boxes or box bodies, and automatic machines are provided for the capping operations. When the ring-shaped bodies are produced, as above described, by cutting off operations, they are usually permitted to fall indiscriminately into a hopper, or upon a conveyor, and in this indiscriminate grouping of the rings they become to a large extent partially interlocked, tilted and overlapped.

A principal object of my invention is to properly separate, straighten out and arrange such box bodies or ring-like articles as they are indiscriminately advanced, and to provide in conjunction with such arranging mechanism suitable conveying and feeding mechanism for moving the bodies from the cutting off mechanism, and delivering them in proper positions to mechanism for applying the caps.

To these ends the invention comprises suitable conveying, arranging and distributing mechanism, the characteristics and advantages of which are sufficiently explained in connection with a detailed description of the accompanying drawings which show an exemplifying structure embodying the invention. After considering this embodiment, persons skilled in the art will understand that many variations and modifications may be made in accordance with the principles of the invention, and I contemplate the employment of any embodiments of the invention which are within the scope of the claims.

In the drawings:

Fig. 1 is a vertical longitudinal section of mechanism embodying the invention; and Fig. 2 is a top plan.

Typical short cylindrical box bodies B are shown in different positions in the apparatus. A conveyor 10 which may be a continuous belt conveyor, running in a trough 11, moves the bodies in indiscriminate positions from a hopper, or the bodies may be discharged from the cutting off mechanism directly onto the conveyor. The discharge end of the conveyor is located in a casing 12 which includes a chute 13, the bottom of which is downwardly inclined so that the bodies are discharged upon another conveyor 15, which is conveniently in the form of an endless belt. Although this conveyor may be arranged in different ways, it is preferable in some cases, as shown in the present instance, to arrange its upper flight at an upward incline from the body receiving point. This active flight of the conveyor may be supported in any suitable way, for instance, by a shelf or table 16. The conveyor belt adjacent to its receiving end is supported by a pulley 17.

The bodies are delivered onto conveyor 15 in indiscriminate positions as they come from the chute 13. Some of the bodies, as indicated in Fig. 1, may lie in desirable flat supported positions on the conveyor. Others may be tilted, one upon another, or they may be partially interlocked or even stand on edge. It is desirable to provide means for separating the bodies and laying them all in separate flat positions on the belt, as indicated, for instance, by the positions of the bodies B', so that they may be delivered properly to separating and feed mechanism for proper presentation to cap applying mechanism, for example.

For this purpose a brush 20, constituting a representative arranging or position-rectifying device for the bodies, is located adjacent to conveyor 15. This brush consists in the present case of a cylindrical body 21 carried by a shaft 22, revolubly mounted in bearings 23. The brush body is provided with suitable groups of bristles 24, trimmed to cylindrical form. Co-operating with the brush is a housing which may conveniently consist of a cage 30 of wire mesh in part cylindrical form arranged intermediate the brush and chute 13. The ends of the cage may be secured to vertical side pieces 31, which close the ends of the cage. The brush is driven so that its lower surface moves in a direction counter to the movement of the conveyor. Any suitable driving means may be provided, represented in this case by a pulley 33 on the brush shaft connected by a belt 34 to an electric motor 35. The bottom of the brush is at such an elevation above the conveyor that box bodies B' properly arranged in flat positions on the conveyor pass freely beneath the brush. Other box bodies which are improperly arranged project up sufficiently to be engaged by the brush bristles and are driven back with considerable vigor into the cage and fall again upon the conveyor until they lie in the proper positions and then they pass on beneath the brush. The bristles have a flexible action which prevents injury to the bodies and assist also in resiliently engaging and vigorously driving back improperly arranged bodies. The brush also assists materially in distributing the bodies throughout the width of the conveyor, since if any considerable number of the bodies are piled together at one point as they reach the brush they tend to spread out laterally when they are driven back and so are distributed and tend to seek vacant spaces on the belt where they may lie in correct positions.

The open-work construction of the cage permits the action of the brush and the location of the bodies upon the belt to be observed.

Adjacent to the conveyor beyond the arranging device are devices for separating the bodies into what may be called "column" arrangement, and delivering them to other mechanisms, (not shown herein) which act upon the bodies, for instance, to provide them with caps. A transverse member 40 is preferably arranged diagonally above the conveyor and may have its ends supported on side members 41 and may be secured thereto by screws 42. This cross member is conveniently of angle construction and to its lower flange are secured a plurality of longitudinal separating strips, or guide rails 43. The forward ends of these strips terminate at 44 in a diagonal line across the conveyor. These ends may be slightly beveled or rounded off as shown. The lower edges of the strips terminate just above the surface of the conveyor. These strips provide in effect a plurality of box body channels slightly wider than the diameter of the box bodies. Means may be provided for preventing the bodies from rising out of the channels, consisting in this case of flat strips 45 secured to cross member 40 and having their forward ends curved slightly upward as at 46. As the box bodies advance, as indicated, at $B^2$, in proper flat position but irregularly distributed across the surface of the conveyor, they either pass directly into one of the channels between two of the strips 43, or encounter the front end 44 of one of the strips and by the movement of the conveyor are deflected laterally into one or other of the channels. If any of the channels are filled with bodies at any moment the bodies that tend to move into these filled channels are deflected laterally toward one side of the conveyor, due to the diagonal arrangement of ends 44 of strips 43 and these bodies naturally tend to enter the first channel in which there is a vacancy; and failing to find any vacancy they accumulate at the side of the conveyor farthest from the arranging mechanism, and any excess may then be removed by hand. However, to avoid the necessity for the attention of an operative, I prefer to provide a discharge chute 48, having side walls 49, at the side of the conveyor at which the bodies tend to accumulate, so that any excess may be discharged to any suitable container and they may then be replaced on conveyor 10 to be rehandled by the mechanism.

Continuations of the column channels may be provided so that a suitable number of columns of box bodies may be delivered to any suitable handling mechanism. This arrangement is exemplified in the case of one of the channels by the provision of side strips 50, 51, connected with or forming a continuation of certain of the strips 43 and bent downwardly at one side of the apparatus to form a chute in which the column of bodies arranged edge to edge descend by gravity to the additional handling mechanism. The corresponding cover strip 45 may be suitably curved to provide another side member for the channel and another strip 52 may be provided to complete the channel formation for the column. The various strips constituting a column channel may be secured in proper relation by a suitable number of bands 55, riveted or otherwise secured to the strips.

Conveyor 15 may be provided with any necessary number of idler pulleys, such as 60—61 supported rotatably on shafts carried by any suitable frame members, such as 62. The course of the active flight of the conveyor may be directed as may be necessary or desirable. For instance from the point at which the upper flight of the conveyor engages idler 60 the conveyor flight may be arranged horizontally and other parts such as the column channels may be arranged accordingly, as shown in the drawing.

Any suitable driving means may be provided for conveyors 10 and 15. They may be driven independently of each other and of the brush 20, or any of the moving devices may be connected, as by pulleys and belts, and driven from any suitable source of power. To give one example, motor 35 may provide power for driving both conveyors, as well as the position-rectifying brush, and suitable belt or gear connections for this purpose may be arranged as may be desirable.

Evidently many changes in general arrangement, as well as detail, may be made without departing from the principles and spirit of the invention; and I do not limit myself to details of construction except in accordance with the claims.

I claim:—

1. Handling and arranging mechanism for annular box bodies, comprising a conveyor, means adjacent to the conveyor for separating articles into plural row arrangement, a discharge opening for surplus articles anterior to the separating means, and position rectifying means in advance of the separating means and discharge opening.

2. Handling and arranging mechanism for bodies of the class described, comprising a continuous upwardly inclined conveyor, means for supplying short cylindrical box bodies indiscriminately to the conveyor, a position rectifying brush arranged above the conveyor, means for driving the brush in reverse relation to conveyor movement, and a cage intermediate the brush and the supplying means.

3. Handling and arranging mechanism for bodies of the class described, comprising a continuous upwardly inclined conveyor, means for supplying short cylindrical box bodies indiscriminately to the conveyor, a position rectifying brush arranged above the conveyor, means for driving the brush in reverse relation to conveyor movement, a cage intermediate the brush and the supplying means, and means for distributing bodies passing the brush into a plurality of rows.

4. Handling and arranging mechanism for bodies of the class described, comprising a conveyor, means for rectifying the positions of articles indiscriminately presented by the conveyor and distributing means comprising a plurality of channels, the receiving ends of the channels being arranged diagonally across the conveyor.

5. Handling and arranging mechanism for bodies of the class described, comprising a primary conveyor, a secondary upward traveling conveyor, a chute receiving box bodies from the primary conveyor and delivering them to the secondary conveyor, a rectifying brush, means for driving the brush, a cage for confining the bodies intermediate the brush and the chute, and means for separating bodies passing the brush into a plurality of rows.

6. Handling and arranging mechanism for bodies of the class described, comprising a conveyor, means for rectifying the positions of articles indiscriminately presented by the conveyor, distributing means comprising a plurality of channels, the receiving ends of the channels being arranged diagonally across the conveyor, and a discharge passage for surplus articles ejected by combined movement of the conveyor and angularity of the channel entrances.

7. Handling and arranging mechanism for bodies of the class described, comprising means for arranging articles in separate, flatwise positions, a traveling belt conveyor for advancing articles so arranged, and a plurality of guide rails located above the conveyor belt in spaced relation and defining article channels with their entrances arranged diagonally across the conveyor.

8. Handling and arranging mechanism for bodies of the class described, comprising means for arranging articles in separate, flatwise positions, a traveling belt conveyor for advancing articles so arranged, a plurality of guide rails located above the conveyor belt in spaced relation and defining article channels with their entrances arranged diagonally across the conveyor, and an article guide rail at one side of the conveyor anterior to the article channels, the guide rail being provided with a discharge opening for surplus articles moved toward it by the combined belt movement and angular effect of the channel entrance.

9. In article handling and arranging mechanism of the class described, a traveling belt conveyor for advancing flat annular articles lying flatwise thereon and in indiscriminate lateral distribution across the conveyor belt, and a plurality of longitudinally spaced guide rails supported slightly above the belt surface and defining a plurality of article channels adapted to receive articles from the belt and direct them in rows or columns, the ends of the guide rails at the channel entrance being arranged diagonally across the face of the belt.

10. In article handling and arranging mechanism of the class described, a traveling belt conveyor for advancing flat annular articles lying flatwise thereon and in indiscriminate lateral distribution across the conveyor belt, a plurality of longitudinally spaced guide rails supported slightly above the belt surface and defining a plurality of article channels adapted to receive articles from the belt and direct them in rows or columns, the ends of the guide rails at the channel entrance being arranged diagonally across the face of the belt, and additional upper guide rails arranged over the respective channels.

Signed at City of Chicago, in the county of Cook, and State of Illinois this 27th day of November, A. D. 1920.

JAMES C. THOM.